United States Patent
Liantonio

(10) Patent No.: US 6,740,827 B1
(45) Date of Patent: May 25, 2004

(54) BI-DIRECTIONAL PILOTED SOLENOID-OPERATED VALVE

(75) Inventor: Vito M. Liantonio, Glen Cove, NY (US)

(73) Assignee: Target Rock Division of Curtis-Wright Flow Control Corporation, E. Farmingdale, NY (US)

( * ) Notice: Subject to any disclaimer, the term of this patent is extended or adjusted under 35 U.S.C. 154(b) by 0 days.

(21) Appl. No.: 10/306,850

(22) Filed: Nov. 27, 2002

(51) Int. Cl.$^7$ .......................... F18K 31/02; H01H 36/00
(52) U.S. Cl. ............................. 200/81.9 M; 200/83 L; 200/83 Z; 200/83 Q; 251/129.09; 251/129.15
(58) Field of Search ............................... 337/1, 2, 8, 12, 337/54, 56; 200/81 R, 81.9 R, 81.9 M, 83 R, 83 L, 83 Q, 83 Z; 251/129.01, 129.09, 129.1, 129.15, 129.2

(56) References Cited

U.S. PATENT DOCUMENTS

| | | | |
|---|---|---|---|
| 2,738,157 A | | 3/1956 | Vargo |
| 2,930,404 A | * | 3/1960 | Kowalski et al. ...... 137/625.65 |
| 3,011,751 A | | 12/1961 | Delany et al. |
| 3,026,906 A | | 3/1962 | Chatham et al. |
| 3,030,981 A | | 4/1962 | Chatham et al. |
| 3,994,318 A | | 11/1976 | Ishigaki |
| 4,010,769 A | * | 3/1977 | De Lorenzo et al. ....... 137/312 |
| 4,082,116 A | | 4/1978 | Stampfli |
| 4,351,509 A | | 9/1982 | Stampfli |
| 4,387,878 A | | 6/1983 | Zukausky |
| 4,558,844 A | | 12/1985 | Donahue, Jr. |
| 4,651,971 A | | 3/1987 | Donahue, Jr. |
| 4,941,504 A | * | 7/1990 | Beauvir ....................... 137/524 |
| 5,036,885 A | * | 8/1991 | Miura .................... 137/625.65 |
| 5,217,043 A | * | 6/1993 | Novakovic .................. 137/460 |
| 5,546,987 A | * | 8/1996 | Sule ......................... 137/625.5 |
| 5,641,148 A | * | 6/1997 | Pena et al. ............. 251/129.07 |
| 6,182,684 B1 | * | 2/2001 | Frankenberg ............... 137/340 |
| 6,505,812 B1 | * | 1/2003 | Anastas .................. 251/129.07 |

FOREIGN PATENT DOCUMENTS

| | | | | |
|---|---|---|---|---|
| JP | 2001193640 A | * | 7/2001 | ........... F04B/27/14 |

OTHER PUBLICATIONS

Liantonio, Vito, "High Pressure Modulating Solenoid Valve for Steam/Gas Service" *The American Society of Mechanical Engineers*, Presented at the Pressure Vessel and Piping Conference, San Diego, California (Jun. 28–Jul. 2, 1987).
Target Rock Corporation, "Solenoid Operated Liquid Modulating Control Valve," cut away view of valve assembly, approximately the early 1980's.

* cited by examiner

Primary Examiner—Anatoly Vortman
(74) Attorney, Agent, or Firm—Hoffmann & Baron, LLP

(57) ABSTRACT

A bi-directional piloted solenoid-operated valve which utilizes fluid pressure to provide both pressure-assisted sealing and pressure-assisted actuation to the main sealing disc in both flow directions. The valve may include a mechanical position indicator for providing visual confirmation of the position of the main disc.

15 Claims, 4 Drawing Sheets

BI-DIRECTIONAL PILOTED SOLENOID-OPERATED VALVE

BACKGROUND OF THE INVENTION

The present invention relates to a solenoid-operated valve and, more particularly, to a bi-directional piloted solenoid-operated valve which utilizes fluid pressure to provide pressure-assisted sealing and pressure-assisted actuation to the main sealing disc in both flow directions.

Pilot-operated valves which provide pressure-assisted sealing/actuation of the main sealing disc in a single flow direction are known. For example, U.S. Pat. Nos. 4,387,878, 4,082,116 and 3,994,318 disclose pilot-operated valves which utilize the inlet fluid pressure to provide both pressure-assisted sealing and pressure-assisted actuation to the main sealing disc. These pilot-operated valves, however, are configured to provide such pressure-assisted sealing/ actuation in a single flow direction only. That is, the inlet port of the valve must always be connected to the higher pressure source. Stated differently, the known prior art valves are incapable of providing the mentioned pressure-assisted sealing/actuation if the flow of fluid is reversed, i.e., if the higher pressure fluid is directed into the outlet port of the valve.

As mentioned, known pilot-operated valves utilize the inlet fluid pressure to provide both pressure-assisted sealing and pressure-assisted actuation to the main sealing disc. This is particularly desirable in larger valves, and those valves used in higher pressure environments. It will be appreciated that larger valves (particularly in higher pressure environments) typically require a large force to move the main sealing disc against the pressurized fluid, thus necessitating the use of a large actuating mechanism and/or requiring a large draw of current if actuated directly by a solenoid coil. In contrast, valves including pilot valves can utilize smaller actuating mechanisms and/or draw significantly less current during operation.

It will be recognized that applications exist wherein the direction of flow of the fluid into the valve may be reversed, that is, either the inlet side or outlet side of the valve may be supplied with higher pressure fluid. One such application involves the control/distribution of fuel on an aircraft carrier. Obviously, prior art valves which provide pressure-assisted sealing/actuation in a single flow direction are unsatisfactory in such an environment.

Moreover, other factors including reliability, protection against leakage and non-electrical visual confirmation of the valve position are desirable in many valve applications, and are particularly desirable in maritime environments such as use on an aircraft carrier.

There is therefore a need in the art for a bi-directional piloted solenoid-operated valve which utilizes fluid pressure to provide pressure-assisted sealing and pressure-assisted actuation to the main sealing disc in both flow directions. Preferably, this same valve should also provide improved reliability, protection against leakage and non-electric visual confirmation of the valve position.

SUMMARY OF THE INVENTION

The present invention, which addresses the needs of the prior art, provides a bi-directional piloted solenoid-operated valve. The valve includes a valve housing, the housing having a first port and a second port. The valve further includes a main disc positioned in the valve housing and selectively movable between an open position and a closed position. The main disc defines a fluid chamber within the valve housing and includes first and second passages extending therethrough and communicating with the fluid chamber. The first passage extends between the fluid chamber and a first flow-diverting mechanism and the second passage extends between the fluid chamber and a second flow-diverting mechanism. The second passage has a greater cross-sectional area than the first passage. The valve further includes a pilot disc cooperating with the second passage and movable between a first position wherein fluid flow is interrupted between the fluid chamber and the second flow-diverting device and a second position wherein fluid flow is established between the fluid chamber and the second flow-diverting device. The first flow-diverting mechanism is selectively movable between the first position wherein a fluid connection is provided between the first port and the fluid chamber and a second position wherein a fluid connection is provided between the second port and the fluid chamber. The second flow-diverting device is selectively movable between a first position wherein a fluid connection is provided between the second port and the fluid chamber and a second position wherein a fluid connection is provided between the first port and the fluid chamber whereupon the application of pressurized fluid to either of the ports provides both pressure-assisted sealing and pressure-assisted actuation of the main disc.

In one preferred embodiment, the valve includes an actuating mechanism for moving the pilot disc between its first position and its second position. The actuating mechanism is preferably an electromagnetic solenoid assembly, which is also coupled to the main disc to selectively move the main disc between the opened and closed positions.

In another preferred embodiment, the valve includes a position indicator for providing visual confirmation of the position of the main disc. The position indicator includes a pivotally mounted lever rotatable between a first position indicating that the main disc is in the closed position and a second position indicating that the main disc is in the open position. Both the main disc and the lever are provided with cooperating magnets which cause the lever to rotate between its first and second positions as the main disc moves between the closed and open positions.

As a result, the present invention provides a bi-directional piloted solenoid-operated valve which utilizes fluid pressure to provide pressure-assisted sealing and pressure-assisted actuation to the main sealing disc in both flow directions. This same valve provides improved reliability, protection against leakage and non-electric visual confirmation of the valve position.

DETAILED DESCRIPTION OF THE INVENTION

Figure 1:
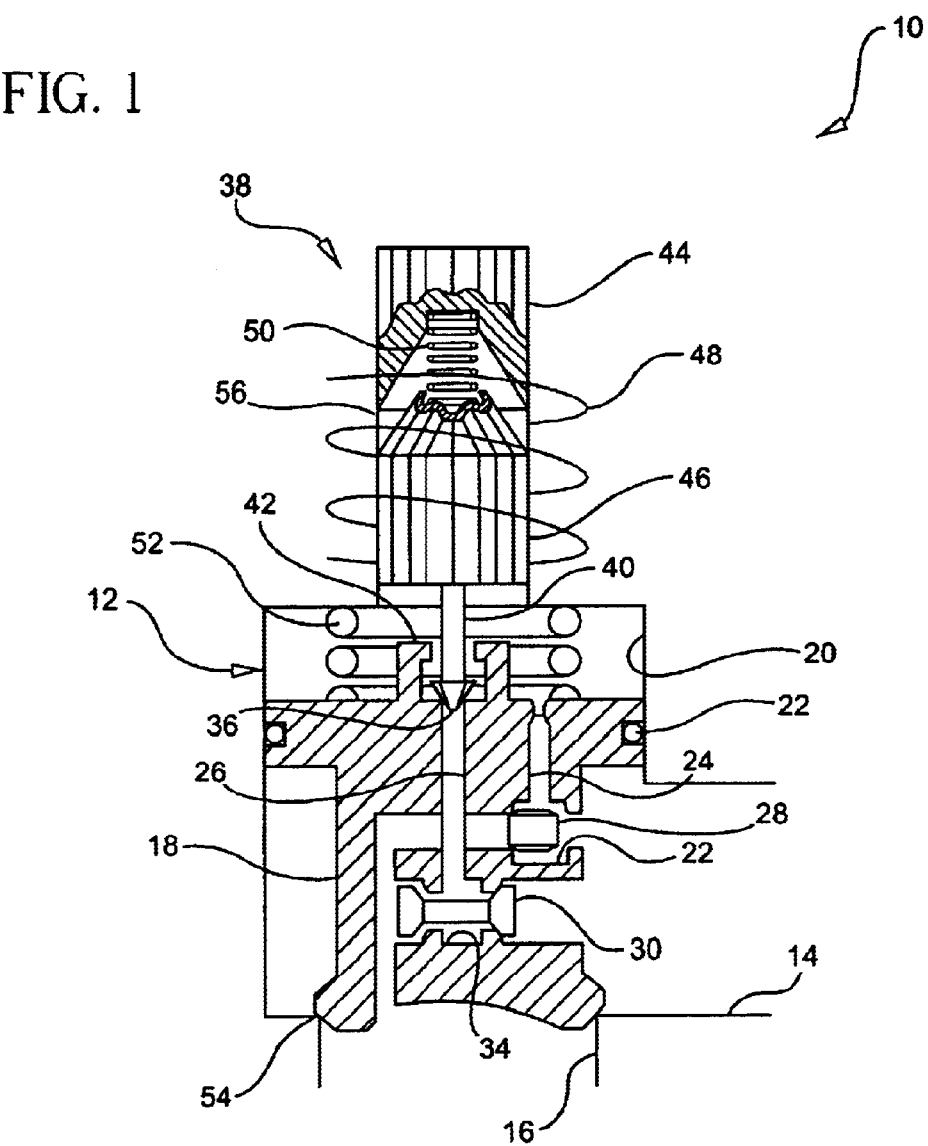
FIG. 1 is a partial schematical cross-sectional view of the valve of the present invention.

Referring to FIG. 1, a bidirectional pilot operated valve 10 is shown. The valve includes a housing 12 having a first port 14 and a second port 16. Positioned within housing 12 is a main sealing disc 18 for controlling the flow of fluid between the first and second ports. In particular, the main disc is movable between a closed position (as shown in FIG. 1) and an open position (not shown). The open position allows unrestricted fluid flow between the first and second ports.

Main disc 18 also defines a fluid chamber 20. Preferably, a seal 22 is positioned about disc 18 to provide continuous sealing between disc 18 and the interior wall of valve housing 12, thus preventing leakage of fluid therebetween. Disc 18 preferably includes a first passage 24 and a second passage 26, both passages communicating with chamber 20. Passage 24 extends between chamber 20 and a first flow-diverting mechanism, e.g., selective shuttle valve 28. Passage 26 extends between fluid chamber 20 and a second flow-diverting mechanism, e.g., inverse shuttle valve 30. Of course, it is contemplated herein that other types of valves (e.g., offset butterfly, check, poppet, spool or diaphragm) can be utilized for the mentioned flow-diverting mechanisms. As explained further hereinbelow, passage 26 is formed with a greater cross-sectional flow area than first passage 24.

Selective shuttle valve 28 is preferably positioned within a cavity 32 that is formed in disc 18 and is in fluid communication with passage 24. In such an arrangement, selective shuttle valve 28 is movable between a first position wherein a fluid connection is provided between port 14 and chamber 20 and a second position wherein a fluid connection is provided between port 16 and chamber 20. It will be appreciated that because cavity 32 is in fluid communication with both ports, selective shuttle valve 28 moves in response to the fluid pressure at the ports. Particularly, if the pressure at port 14 is greater than the pressure at port 16 (i.e., fluid is being directed into port 14), than selective shuttle valve 28 will move to its first position (as shown in FIG. 1) thus establishing a fluid connection between port 14 and chamber 20. If the pressure at port 16 is greater than the pressure at port 1(4 (i.e., fluid is being directed into port 16), than selective shuttle valve 28 will move to its second position (to the right based on the orientation of FIG. 1) thus establishing a fluid connection between port 16 and chamber 20.

Inverse shuttle valve 30 preferably cooperates with a cavity 34 that is formed in disc 18 and is in fluid communication with passage 26. In such an arrangement, inverse shuttle valve is movable between a first position wherein a fluid connection is provided between chamber 20 and port 16 and a second position wherein a fluid connection is provided between chamber 20 and port 14. It will be appreciated that because cavity 34 is in fluid communication with both ports, inverse shuttle valve 30 moves in response to the fluid pressure at the ports. Particularly, if the pressure at port 14 is greater than the pressure at port 16 (i.e., fluid is being directed into port 14), than inverse shuttle valve 30 will move to its first position (as shown in FIG. 1) thus establishing a fluid connection between chamber 20 and port 16. If the pressure at port 16 is greater than the pressure at port 14 (i.e., fluid is being directed into port 16), than inverse shuttle valve 28 will move to its second position (to the right based on the orientation of FIG. 1) thus establishing a fluid connection between chamber 20 and port 14.

As shown in FIG. 1, a pilot disc 36 cooperates with passage 26 and is movable between a first position (as shown in FIG. 1) wherein fluid flow is interrupted between chamber 20 and cavity 34 and a second position (not shown) wherein fluid flow is established between chamber 20 and cavity 34. Pilot disc 36 is preferably actuated via a solenoid assembly 38 attached to housing 12. Particularly, solenoid assembly 38 includes an axially-displaceable rod 40 for moving pilot disc 36. The initial axial displacement of rod 40 causes pilot disc 36 to move from its first to its second position, thus establishing a fluid connection between chamber 20 and cavity 34. Additional axial displacement of rod 40 preferably results in the movement of main disc 18 from the closed position to the open position.

In one preferred embodiment, rod 40 extends through a sleeve 42 coupled to main disc 18. Pilot disc 36 is preferably formed with a wedge-shaped head which is sized to engage sleeve 42 as rod 38 is displaced in a direction away from main disc 18. Upon positive contact between the wedge-shaped head of pilot disc 36 and sleeve 42, main disc 18 is moved in unison with rod 38, thus causing main disc 18 to move to its open position.

As shown in FIG. 1, solenoid assembly 38 is located adjacent chamber 20, and preferably at an orientation wherein rod 40 is coaxially aligned with the direction of travel of main disc 18 (up and down in the orientation of FIG. 1). Solenoid assembly includes a fixed core section 44 and a movable cross section 46, both of which are surrounded by a plurality of coils 48. Application of varying amounts of energy to the coils causes the movable core to move towards the fixed core in a predetermined relationship. Upon de-energizing of the coils, a pilot return spring 50 urges pilot disc 36 back into its first position wherein fluid flow between chamber 20 and cavity 34 is interrupted. In addition, a disc return spring 52 urges main disc 18 back to the closed position. When in the closed position, at least a portion of main disc 18 sealingly contacts a main disc seat 54 formed in housing 12 whereby direct fluid flow between the first and second ports is interrupted.

The cores and coils of the solenoid assembly are preferably surrounded by a housing 56, which is secured to housing 12 of valve 10. Those skilled in the art will appreciate that the design of solenoid assembly 38 allows the actuating mechanism to be sealed within a housing, which in turn is sealed against the valve housing. The need for any dynamic seals between the housings and the outer environment (e.g., valve packing about stems, etc.) is therefore eliminated. It will be recognized that such a design eliminates any possibility of leakage, and also greatly reduces the amount of maintenance normally required in such environments.

Valve 10 has two modes of operation. The first mode utilizes solenoid assembly to move main disc 18 between the open and closed positions. This first mode of operation may be used at any time, but is necessary in the absence of a pressure differential across the first and second ports. The second mode of operation utilizes the pressure differential across the first and second ports to provide both pressure-assisted sealing and pressure-assisted actuation to main disc 18 in both flow directions, and is described in detail hereinbelow.

When the pressure $P_1$ at port 14 is greater than the pressure $P_2$ at port 16 (i.e., fluid is being directed into port 14), selective shuttle valve 28 moves to its first position wherein a fluid connection is established between port 14 and chamber 20. As a result, fluid from port 14 flows into and fills chamber 20 until the control pressure $P_c$ in chamber 20 is equal to the supply pressure $P_1$. With the pilot disc 38 closing passage 26, the seating force of main disc 18 against main disc seat 54 is equal to the sum of 1) the weight of moving parts, 2) the spring forces applied by both disc return spring 52 and pilot return spring 50, and 3) the supply pressure $P_1$ times the disc seating area. Thus, the supply pressure $P_1$ provides at least a portion of the total seating force which seals the main disc against the main disc seat.

To open the valve, solenoid assembly 38 is actuated to move pilot disc 36 to its second position, thus establishing a continuous fluid connection between fluid chamber 20 and port 16. (When the pressure $P_1$ at port 14 is greater than the pressure $P_2$ at port 16, inverse shuttle valve moves to its first position wherein passage 26 is in fluid communication with port 16). Because the control pressure $P_c$ in chamber 20 is greater than the outlet pressure $P_2$ at port 16 and because passage 26 has a larger cross-sectional area of flow than passage 24, fluid will flow from chamber 20 to port 16, thus decreasing the control pressure $P_c$ in chamber 20. Because the supply pressure $P_1$ at port 14 is now greater than the control pressure $P_c$ in chamber 20, the supply pressure $P_1$ will act against main disc 18 and cause main disc 18 to unseat from disc seat 54.

The ratio of piston area (defined by the cylinder wall of chamber 20) to main disc seating area (defined by the cylinder wall of port 16) is selected to provide actuating forces for maximum performance of the valve when operated with pressure differential of the fluid. Typically, a ratio of 2 to 1 of piston area to disc seating area is selected. Thus, a control pressure of ½ ($P_1$–$P_2$) (supply pressure minus outlet pressure) will result in a nulling out of all forces except for the spring forces and the weight of the moving parts. Thus, if the control pressure $P_c$ is designed to fall below the value required to null out forces (which may be accomplished through the ratio of the cross-sectional flow areas of passages 24 and 26), the main disc will lift away from the disc seat without mechanical assistance. Of course, solenoid assembly 38 can be used to accomplish additional movement of main disc 18, if necessary or desired.

To close the valve under this first set of conditions (i.e. the pressure at port 14 exceeding the pressure of port 16), solenoid assembly 38 is actuated to move pilot disc 36 to its first position closing passage 26. Once passage 26 is closed, chamber 20 will begin to fill with fluid and control pressure $P_c$ will begin to approach supply pressure $P_1$. At some point, the total of the varying forces acting on main disc 18 will exceed the forces acting on the underside of main disc 18 (resulting from supply pressure $P_1$), and disc 18 will move to the closed position.

When the pressure $P_2$ at port 16 is greater than the pressure $P_1$ at port 14 (i.e., fluid is being directed into port 16), selective shuttle valve 28 moves to its second position wherein a fluid connection is established between port 16 and chamber 20. As a result, fluid from port 16 flows into and fills chamber 20 until the control pressure $P_c$ in chamber 20 is equal to the supply pressure $P_2$. With the pilot disc 38 closing passage 26, the seating force of main disc 18 against main disc seat 54 is equal to the sum of 1) the weight of moving parts, 2) the spring forces applied by both disc return spring 52 and pilot return spring 50, and 3) the supply pressure $P_2$ times the disc seating area. Thus, the supply pressure $P_2$ provides a pressure assisted portion of the total seating force which seals the main disc against the main disc seat.

To open the valve, solenoid assembly 38 is actuated to move pilot disc 36 to its second position, thus establishing a continuous fluid connection between chamber 20 and port 14. (When the pressure $P_2$ at port 16 is greater than pressure $P_1$ at port 14, the inverse shuttle valve moves to its second position wherein passage 26 is in fluid communication with port 14). Because the control pressure $P_c$ in chamber 20 is greater than the outlet pressure $P_2$ at port 14 and because passage 26 has a larger cross-sectional area of flow than passage 24, fluid will flow from chamber 20 to port 14, thus decreasing the control pressure $P_c$ in chamber 20. Because the supply pressure $P_2$ at port 16 is now greater than the control pressure $P_c$ in chamber 20, the supply pressure $P_2$ will act against main disc 18 and cause main disc 18 to unseat from disc seat 54.

To close the valve under this second set of conditions (i.e. the pressure at port 16 exceeding the pressure at port 14), solenoid assembly 38 is actuated to move pilot disc 36 to its first position closing passage 26. Once passage 26 is closed, chamber 20 will begin to fill with fluid and control pressure $P_c$ will begin to approach supply pressure $P_2$. At some point, the total of the varying forces acting on main disc 18 will exceed the forces acting on the underside of main disc 18 (resulting from supply pressure $P_2$), and disc 18 will move to the closed position.

It is recognized herein that under certain conditions wherein the pressure differential across the ports is relatively small (e.g., approximately plus or minus 1 psi), solenoid assembly 38 may be required to properly operate the valve. Of course, under such conditions the force required to move disc 18 is not particularly large, nor is a large draw of current required. As such, solenoid assembly 38 is capable of fully displacing disc 18 between the closed and open positions.

Figure 2:
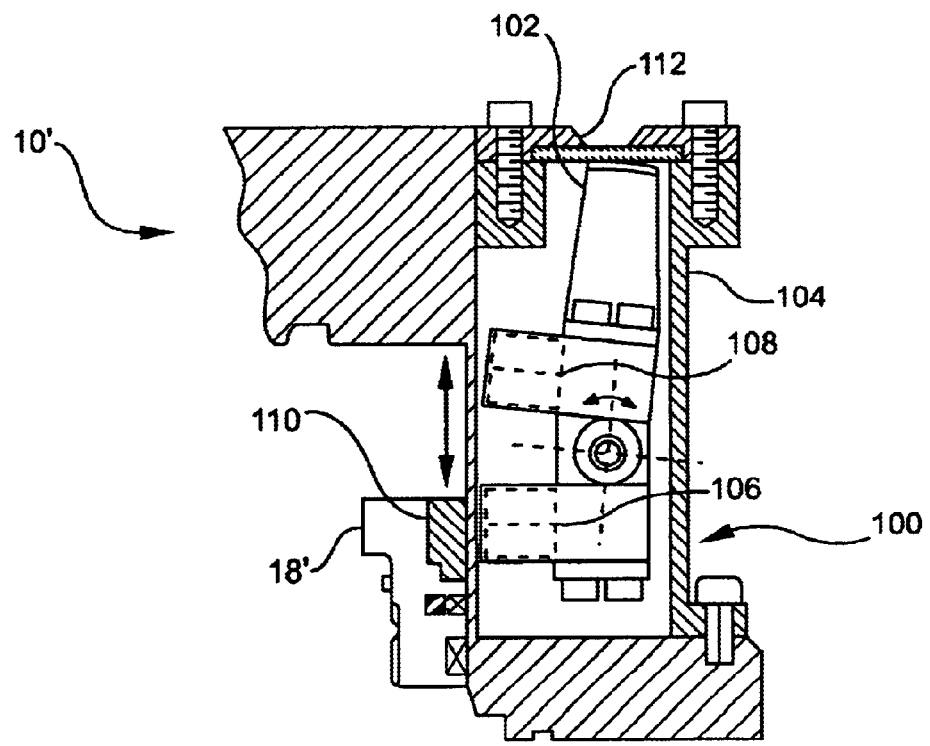
FIG. 2 is a cross-sectional view of a position indicator showing the pivotally mounted lever in the first position.
Figure 2A:
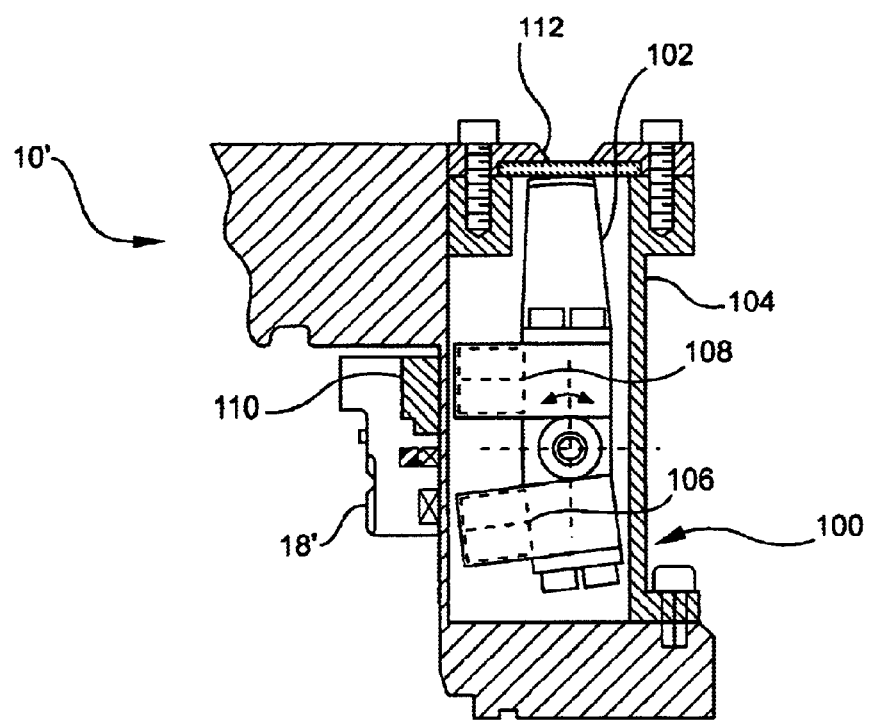
FIG. 2a is a cross-sectional view of the position indicator showing the pivotally mounted lever in the second position.

In one preferred embodiment, the valve, i.e. valve 10', includes a mechanical position indicator 100 (see FIGS. 2–2a). Indicator 100 includes an arch-shaped lever 102 pivotally mounted within a housing 104. A first magnet 106 is mounted on lever 102 below the pivot point and a second magnet 108 is mounted on the lever above the pivot point. Magnets 106 and 108 are both attracted to a magnet 110 positioned about the periphery of disc 18'.

Valve 10' is shown in the closed position in FIG. 2, i.e., main disc 18' is seated against the main disc seat to interrupt direct flow between the ports. In this closed state, magnet 110 is located at a position below the pivot point which tends to attract magnet 106 thereto. This magnetic attraction causes lever 102 to rotate clockwise about the pivot point. An operator looking through window 112 can then visually confirm the position of the main disc. It will be appreciated that this mechanical position indicator operates without the need for any electrical power and without the need to physically penetrate the walls of the valve housing.

When valve 10' is opened, main disc 18' moves upward to the position shown in FIG. 2a, thus locating magnet 110 at a position above the pivot point which tends to attract magnet 108 thereto. This magnetic attraction causes lever 102 to rotate counter-clockwise about the pivot point. (See FIG. 2a). Again, an operator looking through window 112 can visually confirm the position of the main disc.

Figure 3:
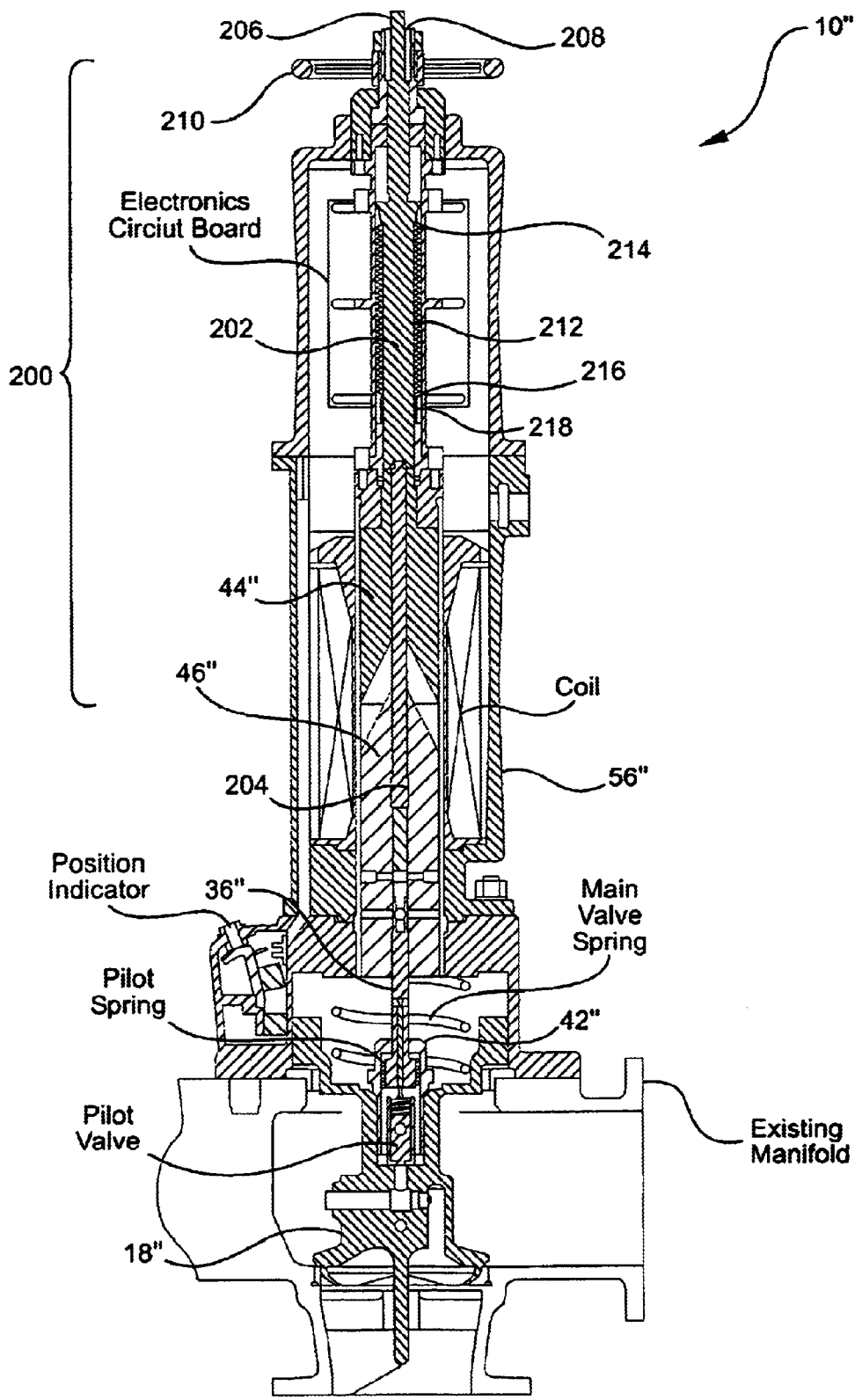
FIG. 3 is a cross-sectional view of a valve formed in accordance with the present invention including a manual override mechanism.

In another preferred embodiment, the valve, i.e. valve 10", includes a manual override mechanism 200 (see FIG. 3). Mechanism 200 provides an emergency backup apparatus for operating main disc 18" in the event of an electrical failure. Those skilled in the art will appreciate that a manual override mechanism requires that some movable portion thereof penetrate housing 56", thus creating the possibility of leakage and typically requiring the use of a dynamic seal, e.g. valve packing. However, it has been discovered herein that a manual override mechanism (wherein a movable portion penetrates housing 56") can be designed to eliminate the need for a dynamic seal thereby ensuring a hermetic seal between the interior of the valve and the outer environment.

Referring now to FIG. 3, override mechanism 200 includes a stem 202 slidably supported within housing 56". Stem 202 has a proximal end 204 which cooperates with movable core 46" whereby axial displacement of stem 202 in a direction away from main disc 18" causes axial displacement of movable core 46" in the same direction. Inasmuch as movable core 46" is coupled to main disc 18" via pilot disc 36" and sleeve 42" (as described hereinabove), axial displacement of movable core 46" in a direction away from main disc 18" causes main disc 18" to move to its open position. As shown, stem 202 slidably extends through fixed core 44" and includes a distal end 206 which cooperates with a threaded collar 208. A handwheel 210 is connected to collar 208 such that rotation of handwheel 210 causes rotation of collar 208. In turn, rotation of collar 208 causes axial displacement of stem 202.

A flexible bellows 212 surrounds stem 202 and includes a first end 214 sealably connected to stem 202, preferably proximate the distal end of stem 202. The second end 216 of the bellows is sealably connected to a positionally fixed collar 218, which is sealed against the stem-supporting structure of mechanism 200. It will be appreciated that bellows 212 can expand as stem 202 is axially displaced in a direction away from main disc 18". It will be further appreciated that any fluid which leaks into housing 56" cannot ultimately pass beyond the seal between first end 214 of the bellows and the stem. The remaining seals utilized within housing 56" can be static-type seals which do not present the leakage risks associated with of dynamic seals. As override mechanism 200 is operated, the distal end of stem 202 extends through handwheel 210, thus providing a visual indication of the manual override position.

Bellows 212 may be formed from a metal such as an austenitic stainless steel, e.g., stainless steel 316. The bellows is designed such that the required displacement does not cause the individual convolutions to exceed their elastic limit. Moreover, the bellows is designed with a predetermined cycle life, e.g., 10,00 cycles. When the bellows is formed from a metal, it may be connected to the stem and to collar 218 via welding or any other suitable process. Alternatively, the bellows may be formed from a plastic or rubber material, provided that the chosen material is compatible with the fluid flowing through the valve. Finally, it is contemplated that the override mechanism described hereinabove may be utilized in both piloted and non-piloted solenoid operated valves.

While there have been described what are presently believed to be preferred embodiments of the present invention, those skilled in the art will realize that other and further changes and modifications can be made thereto without departing from the scope of the invention, and it is intended to claim all such changes and modifications that fall within the scope of the invention.

What is claimed is:

1. A bidirectional piloted solenoid-operated valve, comprising:

a valve housing, said housing having a first port and a second port;

a main disc positioned in said valve housing and selectively movable between an open position and a closed position, said main disc defining a fluid chamber within said valve housing and including first and second passages extending therethrough and communicating with said fluid chamber, said first passage extending between said fluid chamber and a first flow-diverting mechanism and said second passage extending between said fluid chamber and a second flow-diverting mechanism, said second passage having a greater cross-sectional flow area than said first passage;

a pilot disc cooperating with said second passage and movable between a first position wherein fluid flow is interrupted between said fluid chamber and said second flow-diverting device and a second position wherein fluid flow is established between said fluid chamber and said second flow-diverting device; and wherein said first flow-diverting mechanism is selectively movable between a first position wherein a fluid connection is provided between said first port and said fluid chamber and a second position wherein a fluid connection is provided between said second port and said fluid chamber, and wherein said second flow-diverting device is selectively movable between a first position wherein a fluid connection is provided between said second port and said fluid chamber and a second position wherein a fluid connection is provided between said first port and said fluid chamber whereupon the application of pressurized fluid to either of said ports provides both pressure-assisted sealing and pressure-assisted actuation to said main disc.

2. The valve according to claim 1, further comprising an actuating mechanism for moving said pilot disc between its first position and its second position.

3. The valve according to claim 2, wherein said actuating mechanism is coupled to said main disc to selectively move said main disc between said open and closed position.

4. The valve according to claim 3, wherein said actuating mechanism comprises an electromagnetic solenoid assembly.

5. The valve according to claim 4, further comprising a manual override mechanism, said override mechanism including a manually displaceable stem cooperating with said actuating mechanism whereby displacement of said stem causes said actuating mechanism to selectively move said main disc, said override mechanism further including a bellows which surrounds said stem which is sealably connected to said stem at one side thereof to prevent leakage of fluid there past.

6. The valve according to claim 5, wherein said stem has a proximal end which cooperates with said actuating mechanism and a distal end which cooperates with a rotatable threaded collar, said stem extending through said threaded collar thereby providing a visual indication of the position of said stem, and further comprising a handwheel for turning said threaded collar whereby axial displacement of said stem is accomplished.

7. The valve according to claim 6, further comprising a positionally-fixed collar surrounding said stem, and wherein the other end of said bellows is sealably coupled to said positionally-fixed collar whereby rotational movement of said stem is substantially precluded during axial displacement thereof.

8. The valve according to claim 4, wherein said solenoid assembly includes a pilot disc return spring for urging said pilot disc into its first position when said solenoid assembly is deenergized.

9. The valve according to claim 1, wherein said valve housing includes a main disc seat, and wherein at least a portion of said main disc contacts main disc seat to interrupt direct fluid flow between said first and second ports when said main disc is in said closed position.

10. The valve according to claim 9, wherein said main disc seat is positioned at the opening of said second port; and further comprising a seal located about said main disc and contacting said valve housing to seal said fluid chamber against leakage between said main disc and said valve housing.

11. The valve according to claim 1, wherein said first and second flow-diverting mechanisms comprise shuttle valves.

12. The valve according to claim 1, further comprising a return spring cooperating with said main disc to urge said main disc into said closed position.

13. The valve according to claim 1, further comprising a position indicator for providing visual confirmation of the position of the main disc. said position indicator including a pivotally mounted lever rotatable between a first position indicating that said main disc is in said closed position and a second position indicating that said main disc in said open position, and wherein both said main disc and said lever are provided with cooperating magnets which cause said lever to rotate between its first and second position as said main disc moves between said closed and open positions.

14. The valve according to claim 13, wherein said lever is arch-shaped and located within a housing, said housing including a window for visually observing the position of said lever.

15. A solenoid operated valve, comprising:
   a valve housing, said housing having a first port and a second port;
   a main disc positioned in said valve housing and selectively movable between an open position and a closed position;
   an actuating mechanism coupled to said main disc to selectively move said main disc between said open and closed positions, said actuating mechanism including an electromagnetic solenoid assembly having a fixed core and a movable core; and
   a manual override mechanism including an axially displaceable stem, a flexible bellows, a rotatably threaded collar and a positionally-fixed collar, said stem slidably extending through said fixed core and coupled at one end to said movable core, the other end of said stem cooperating with said threaded collar whereby rotation of said threaded collar causes axial displacement of said stem, and wherein said bellows surrounds said stem and is sealably connected to said stem at one side thereof to prevent leakage of fluid there past, the other end of said bellows being sealably coupled to said positionally-fixed collar.

* * * * *

UNITED STATES PATENT AND TRADEMARK OFFICE
CERTIFICATE OF CORRECTION

PATENT NO. : 6,740,827 B1
DATED : May 25, 2004
INVENTOR(S) : Liantonio

It is certified that error appears in the above-identified patent and that said Letters Patent is hereby corrected as shown below:

<u>Column 3,</u>
Line 37, now reads, "1(4 (i.e., fluid is" should read -- 14 (i.e., fluid is --

<u>Column 9,</u>
Line 8, now reads, "the main disc. said" should read -- the main disc, said --

Signed and Sealed this

Thirtieth Day of November, 2004

JON W. DUDAS
*Director of the United States Patent and Trademark Office*